United States Patent [19]

Nagano et al.

[11] Patent Number: 4,876,919
[45] Date of Patent: Oct. 31, 1989

[54] POWER TRANSFER DEVICE FOR FOUR-WHEEL DRIVE

[75] Inventors: Shuji Nagano; Masaki Inui, both of Toyota, Japan

[73] Assignee: Toyota Jidosha Kabushiki Kaisha, Aichi, Japan

[21] Appl. No.: 223,384

[22] Filed: Jul. 25, 1988

[30] Foreign Application Priority Data

Jul. 24, 1987 [JP] Japan .................................. 62-186118

[51] Int. Cl.⁴ .................... F16H 35/04; B60K 17/354; B60K 17/352
[52] U.S. Cl. ...................................... 74/650; 180/247; 180/250
[58] Field of Search .................. 74/650; 180/247, 249, 180/250

[56] References Cited

U.S. PATENT DOCUMENTS

| 4,292,860 | 10/1981 | Kako et al. | 180/247 |
| 4,601,359 | 7/1986 | Weismann et al. | 180/233 |
| 4,699,237 | 10/1987 | Matsumoto | 180/250 |
| 4,711,136 | 12/1987 | Yoshinaka et al. | 74/665 GA |
| 4,723,459 | 2/1988 | Yoshinaka et al. | 74/477 |
| 4,802,383 | 2/1989 | Katayama et al. | 180/249 |

FOREIGN PATENT DOCUMENTS

| 61-207219 | 12/1985 | Japan . | |
| 0143734 | 6/1987 | Japan | 180/248 |
| 0149512 | 7/1987 | Japan | 180/249 |
| 0173328 | 7/1987 | Japan | 180/249 |
| 0034233 | 2/1988 | Japan | 180/249 |
| 0097429 | 4/1988 | Japan | 180/249 |
| 0149223 | 6/1988 | Japan | 180/249 |

Primary Examiner—Dwight G. Diehl
Assistant Examiner—Harold F. Macris
Attorney, Agent, or Firm—Oliff & Berridge

[57] ABSTRACT

In combination with a power transfer device, a power transmission includes a first shaft rotatably mounted within a housing and having an input end for connection to an output shaft of the transmission and an output end for drive connection to a pair of rear road wheels, a second shaft rotatably mounted within the housing in parallel with the first shaft for drive connection to a pair of rear road wheels, a drive member rotatable on the first shaft, a driven member mounted on the second shaft for rotation therewith and being drivingly connected to the drive member, a limited-clip differential in the form of viscous clutch coupling having an outer casing mounted on the first shaft for rotation therewith and coupled in a liquid-tight manner with an inner sleeve rotatably on the first shaft for defining a viscous fluid chamber and for relative rotation thereto, and a clutch sleeve axially movably mounted on a hub portion of the drive member for rotation therewith and shiftable between a first position where it is engaged with both the outer casing and inner sleeve of the coupling and a second position where it is engaged with only the inner sleeve of the coupling.

4 Claims, 3 Drawing Sheets

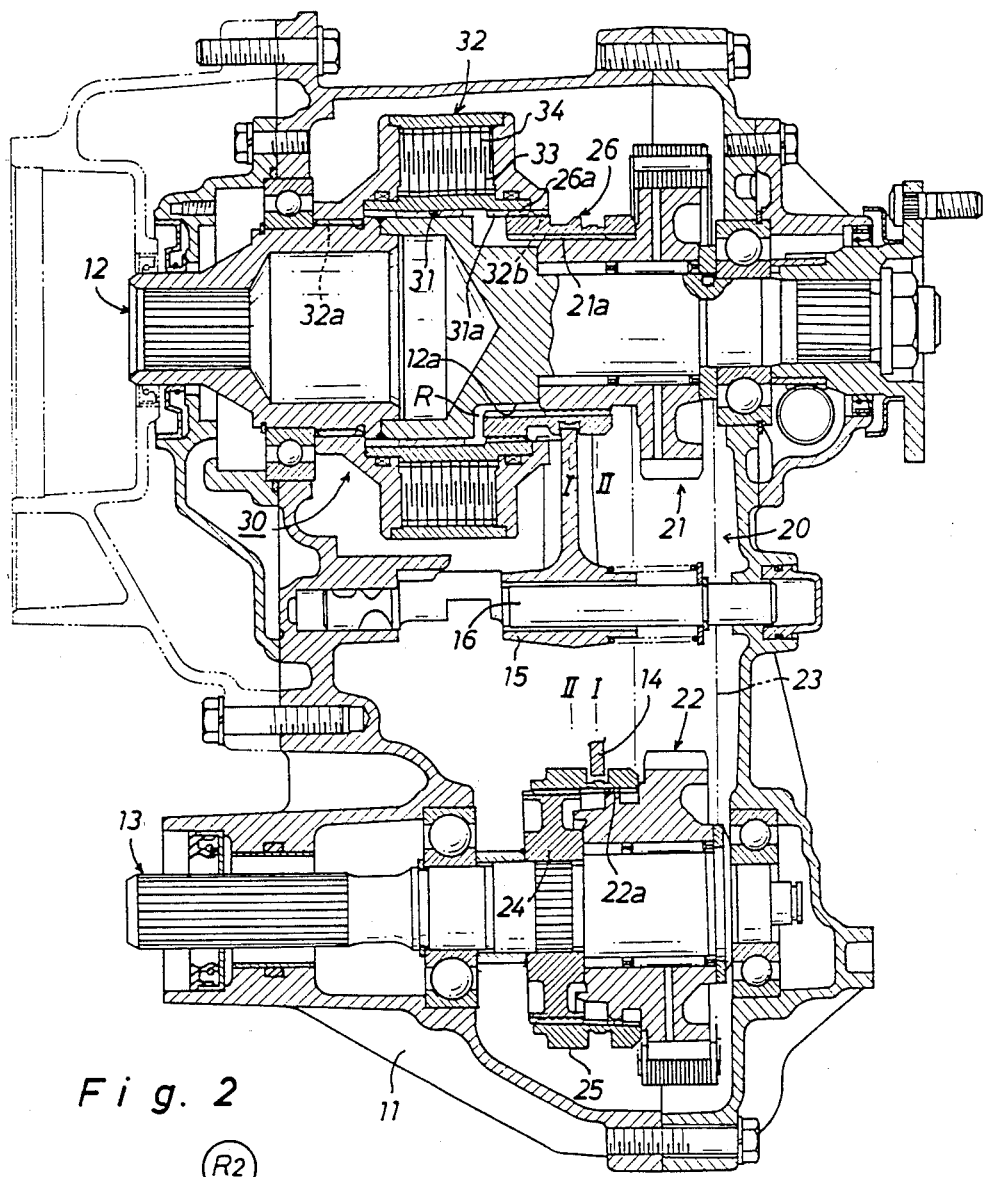
Fig. 1
Fig. 2

POWER TRANSFER DEVICE FOR FOUR-WHEEL DRIVE

BACKGROUND OF THE INVENTION

1. Field of the Invention

The present invention relates to a power transfer device for four-wheel drive vehicles, and more particularly to a power transfer device of the type which includes a limited-slip differential arranged to effect differentiation between the front and rear axles.

2. Description of the Prior Art

In Japanese Patent Early Publication No. 61-207219 issued on Sept. 13, 1986, there has been proposed a power transfer device adapted for use in combination with a power transmission, which transfer device comprises a first shaft rotatably mounted within a housing and having an input end for drive connection to an output shaft of the transmission and an output end for drive connection to a set of rear road wheels, a second shaft rotatably mounted within the housing in parallel with the first shaft for drive connection to a set of front road wheels, a drive member rotatably mounted on the first shaft and connectable thereto, a driven member rotatably mounted on the second shaft and connectable thereto, the driven member being drivingly connected to the drive member, and a pair of clutch sleeves each mounted on the first and second shafts and shiftable between a first position where both the clutch sleeves are retained to connect the drive and driven members to the first and second shafts for providing a four-wheel drive and a second position where both the clutch sleeves are retained to disconnect the drive and driven members from the first and second shafts for providing a two-wheel drive.

In operation of the power transfer device, differentiation between the front and rear axles is required when the front road wheels of the vehicle travel at a different distance that the rear road wheels, such as may occur in cornering. The differentiation, however, may not be effected in the power transfer device because of no provision of any differential, resulting in the occurrence of a tight corner braking phenomenon during travel of the vehicle if the four-wheel drive mode. Such a tight corner braking phenomenon will be avoided if the two-wheel drive mode is selected at the power transfer device prior to steering operation of the vehicle. It is, however, inconvenient to frequently select the two-wheel drive mode at the power transfer device at each time when the vehicle is steered. Although such problems can be solved by use of a differential of the bevel gear type at the power transfer device to effect the differentiation between the front and rear axles, the power transfer device becomes heavy and complicated in construction, and the differential will cause unpleasant gear noises in operation. In assembly of the differential, the first shaft of the transfer device must be divided into two sections for connection to both side gears of the differential. This results in an increase of the number of bearings for support of the first shaft and in a decrease of support rigidity of the first shaft.

SUMMARY OF THE INVENTION

It is, therefore, a primary object of the present invention to provide a power transfer device wherein a limited-slip differential in the form of a viscous clutch coupling is disposed in a compact construction to effect differentiation between the front and rear axles thereby to solve the problems described above.

According to the present invention, the primary object is accomplished by providing a power transfer device adapted for use in combination with a power transmission for an automotive vehicle, which transfer device comprises a housing, a first shaft rotatably mounted within the housing and having an input end for drive connection to an output shaft of the transmission and an output end for drive connection to a first set of road wheels, a second shaft rotatably mounted within the housing in parallel with the first shaft for drive connection to a second set of road wheels, a drive member rotatably mounted on the first shaft, a driven member mounted on the second shaft for rotation therewith and being drivingly connected to the drive member, a limited-slip differential in the form of a viscous clutch coupling including a drum-like outer casing mounted on the first shaft for rotation therewith, an inner sleeve coupled with the outer casing in a liquid-tight manner for defining a viscous fluid chamber and for relative rotation thereto and being rotatably mounted on the first shaft, a first set of viscous coupling plates splined to an internally splined portion of the outer casing, and a second set of viscous coupling plates splined to an externally splined portion of the inner sleeve and being interleaved with the first set of coupling plates, and a clutch sleeve axially movably mounted on a hub portion of the drive member for rotation therewith and shiftable between a first position where it is retained to engage both the outer casing and inner sleeve of the clutch coupling and a second position where it is retained to engage only the inner sleeve of the clutch coupling.

BRIEF DESCRIPTION OF THE DRAWINGS

Additional objects, features and advantages of the present invention will be more readily appreciated from the following detailed description of preferred embodiments thereof when considered with reference to the accompanying drawings, in which:

FIG. 1 is a sectional view of a preferred embodiment of a power transfer device in accordance with the present invention;

FIG. 2 illustrates a shift pattern of a shift lever adapted to the transfer device;

DESCRIPTION OF THE PREFERRED EMBODIMENTS

Figure 3:
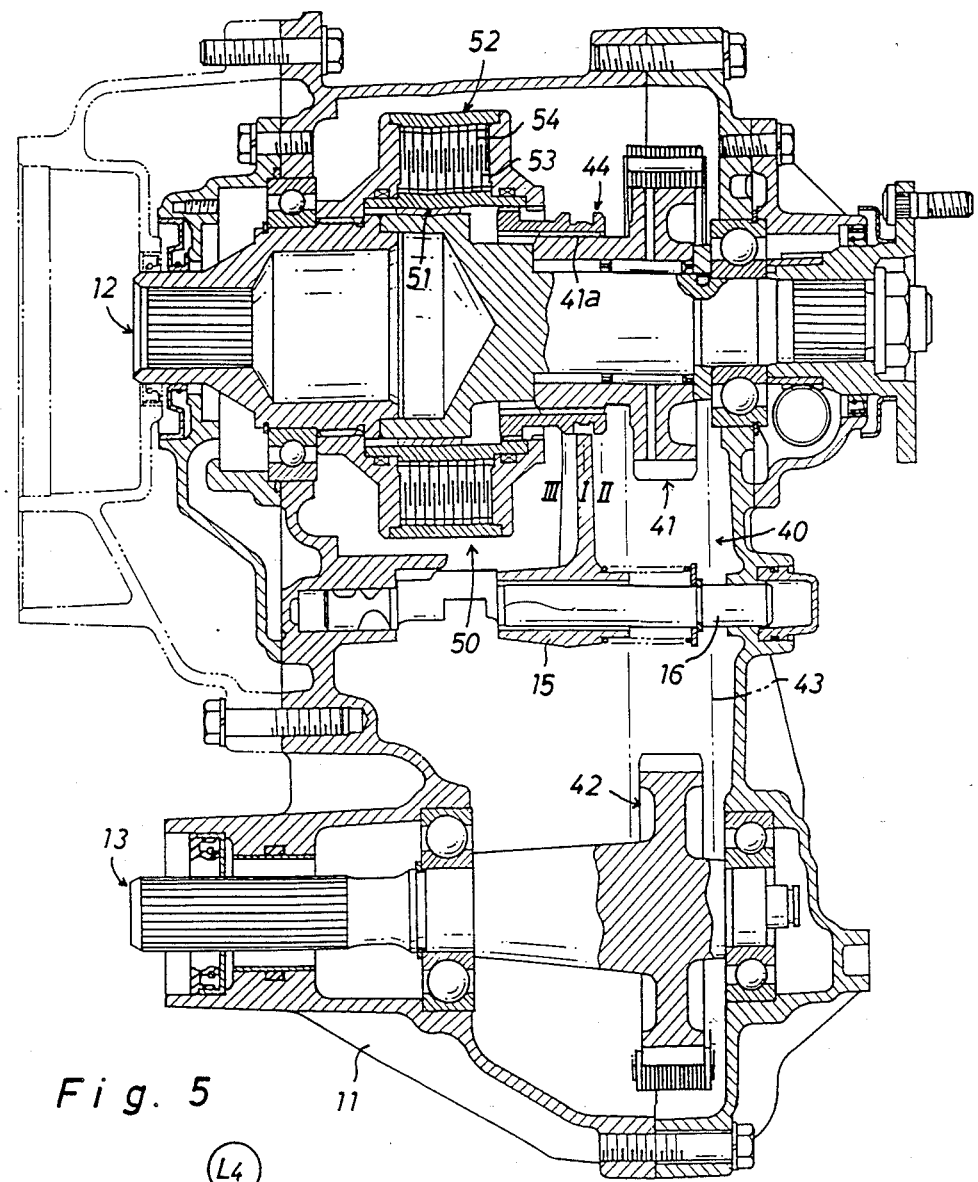
FIG. 3 is a sectional view of a modification of the power transfer device.

In FIG. 1 of the drawings, there is illustrated a power transfer device in accordance with the present invention which is adapted for use in combination with a power transmission (not shown) for a four-wheel drive vehicle. The power transfer device includes a housing 11 to be secured to a transmission casing (not shown), a first shaft 12 rotatably mounted within the housing 11 and having an input end for drive connection to an output shaft of the power transmission and an output end for drive connection to a set of rear road wheels (not shown), a second shaft 13 rotatably mounted within the housing 11 in parallel with the first shaft 12 for drive connection to a set of front road wheels (not shown), a torque transfer mechanism 20 for drivingly interconnecting the first and second shafts 12 and 13, and a limited-slip differential in the form of a viscous clutch coupling 30 mounted on the first shaft 12.

The torque transfer mechanism 20 includes a drive sprocket 21 rotatably mounted on the first shaft 12, a driven sprocket 22 rotatably mounted on the second shaft 13 and being drivingly connected to the drive sprocket 21 by means of a drive chain 23, an externally splined hub member 24 mounted on the second shaft 13 for rotation therewith, an internally splined clutch sleeve 25 axially slidably mounted on the hub member 24, and an internally splined clutch sleeve 26 axially slidably mounted on an externally splined hub portion 21a of drive sprocket 21. The clutch sleeve 25 is arranged to be brought into engagement with external spline teeth 22a formed on the left end hub portion of driven sprocket 22. When retained in a first position I, the clutch sleeve 25 is maintained in engagement with the external spline teeth 22a of driven sprocket 22 to rotate the driven sprocket 22 with the second shaft 13. When shifted to and retained in a second position II, the clutch sleeve 25 is disengaged from the external spline teeth 22a of driven sprocket 22 to permit free rotation of the driven sprocket 22 on the second shaft 13. The power transfer device comprises a shift mechanism which includes first and second shift forks 14 and 15 respectively coupled with the clutch sleeves 25 and 26. The second shift fork 15 is carried at its base portion on a slide rod 16 which is axially slidably mounted within the housing 11. The shift forks 14 and 15 are operatively connected to a single shift lever (not shown) which is arranged in the vehicle compartment to be shifted by the driver. In FIG. 2, there is illustrated a shift pattern of the shift lever, wherein the characters $F_4$ and $L_4$ each indicate first and second positions for four-wheel drive, and the character $R_2$ indicates a position for two-wheel drive. The shift lever is selectively retained in the respective positions $F_4$, $L_4$ and $R_2$ by means of a detent mechanism (not shown) mounted within the transfer device. When the shift lever is retained in the first position $F_4$ for four-wheel drive, the first shift fork 14 is positioned to retain the clutch sleeve 25 in the first position I, while the second shift fork 15 is positioned to retain the clutch sleeve 26 in a first position I as shown by a lower half thereof in the figure. When the shift lever is shifted to and retained in the second position $L_4$ for four-wheel drive, the first shift fork 14 is positioned to retain the clutch sleeve 25 in the first position I, while the second shift fork 15 is positioned to retain the clutch sleeve 26 in a second position II as shown by an upper half thereof in the figure. When the shift lever is shifted to and retained in the position $R_2$ for two-wheel drive, the first shift fork 14 is positioned to retain the clutch sleeve 25 in the second position II, while the second shift fork 15 is positioned to retain the clutch sleeve 26 in the first position I.

The limited-slip differential 30 includes an inner sleeve 31 coupled with a drum-like outer casing 32 in a liquid-tight manner for defining a viscous fluid chamber and for relative rotation thereto, a first set of viscous coupling plates 33 splined to an externally splined portion of the inner sleeve 31 for rotation therewith, and a second set of viscous coupling plates 34 splined to an internally splined portion of the outer casing 32 for rotation therewith and interleaved with the first set of coupling plates 33. The viscous fluid chamber formed between the inner sleeve 31 and outer casing 32 is filled with a predetermined amount of silicone fluid. The inner sleeve 31 is rotatably mounted on the first shaft 12 at its left-hand portion, while the outer casing 32 is splined to the first shaft 12 at its left-hand portion 32a for rotation therewith. The inner sleeve 31 is formed at its right-hand portion with internal spline teeth 31a, and the outer casing 32 is formed at its right-hand portion with internal spline teeth 32b. In such an arrangement as described above, the internal spline teeth 31a and 32b are located in an annular space R which is formed by an annular stepped portion 12a of first shaft 12 to accomodate the left-hand portion of clutch sleeve 26 therein. The clutch sleeve 26 is formed at its left-hand portion with external spline teeth 32b engageable with the internal spline teeth 31a and 26b of inner sleeve 31 and outer casing 32.

Hereinafter, operation of the power transfer device will be described with reference to FIGS. 1 and 2. Assuming that the shift lever is retained in the first position $F_4$ for four-wheel drive, the clutch sleeve 25 is retained by the first shift fork 14 in the first position I to connect the driven sprocket 22 to the second shaft 13, while the clutch sleeve 26 is retained by the second shift fork 15 in the first position I to engage only the internal spline teeth 31a of inner sleeve 31. In this condition, the first shaft 12 acts to transfer the output drive torque from the power transmission to the front road wheels therethrough, while the limited-slip differential 30 normally allows the second shaft 13 to rotate at a different speed than the first shaft 12 to effect differentiation between the front and rear axles. This is effective to eliminate a tight corner braking phenomenon during travel of the vehicle in the four-wheel drive mode. As the resistance to shearing of the viscous fluid between the coupling plates 33 and 34 increases, the limited-slip differential 30 acts to transfer the output drive torque to the second shaft 13 through the clutch sleeve 26, drive sprocket 21, chain 23 and driven sprocket 22.

When the shift lever is shifted to and retained in the second position $L_4$ for four-wheel drive, the clutch sleeve 25 is retained by the first shift fork 14 in the first position I to connect the driven sprocket 22 to the second shaft 13, while the clutch sleeve 26 is retained by the second shift fork 15 in the second position II to engage both the internal spline teeth 31a and 32b of inner sleeve 31 and outer casing 32. In this condition, the limited-slip differential 30 is locked by engagement with the clutch sleeve 26 to connect therethrough the drive sprocket 21 to the first shaft 12. Thus, the first shaft 12 is drivingly connected to the second shaft 13 through the drive chain 23 to transfer the output drive torque from the power transmission to the front and rear road wheels to provide a four-wheel drive.

When the shift lever is shifted to and retained in the position $R_2$ for two-wheel drive, the clutch sleeve 25 is retained by the first shift fork 14 in the second position II to permit free rotation of the driven sprocket 22 on the second shaft 13, while the clutch sleeve 26 is retained by the second shift fork 15 in the first position I to engage only the internal spline teeth 31a of inner sleeve 31. In such a condition, the first shaft acts to transfer the output drive torque from the power transmission only to the rear road wheels thereby to provide a two-wheel drive.

Figure 5:
FIG. 5 illustrates a shift pattern of a shift lever adapted to the transfer device of FIG. 3.

In FIG. 3 there is illustrated a modification of the power transfer device wherein a torque transfer mechanism 40 and a viscous clutch coupling 50 are substituted for the torque transfer mechanism 20 and the viscous clutch coupling 30 shown in FIG. 1. The torque transfer mechanism 40 includes a drive sprocket 41 rotatably mounted on the first shaft 12, a driven sprocket 42 provided on the second shaft 13 for rotation therewith and being drivingly connected to the drive sprocket 41 by means of a drive chain 43, and an internally splined clutch sleeve 44 axially slidably mounted on an externally splined hub portion 41a of drive sprocket 41. The clutch sleeve 44 is carried by the shift fork 15 to be shifted substantially in the same manner as that in the power transfer device shown in FIG. 1. In this modification, the shift pattern of the shift lever is arranged as shown in FIG. 5.

Figure 4:
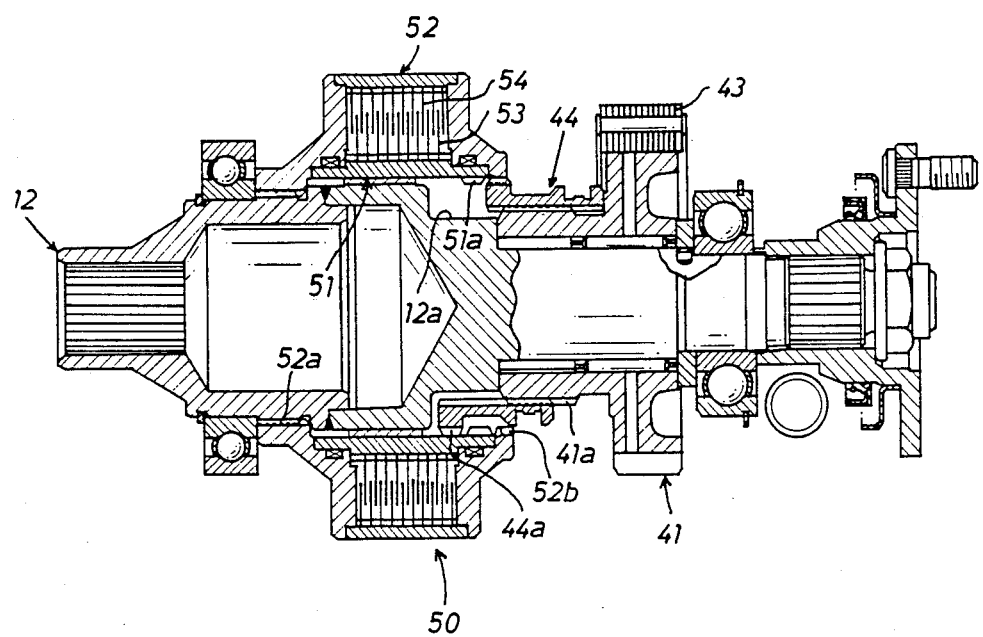
FIG. 4 is a sectional view showing a shifted condition of the transfer device of FIG. 3.

As shown in FIGS. 3 and 4, the viscous clutch coupling 50 includes an inner sleeve 51 coupled with a drum-like outer casing 52 in a liquid-tight manner for defining a viscous fluid chamber and for relative rotation thereto, a first set of viscous coupling plates 53 splined to an externally splined portion of the inner sleeve 51 for rotation therewith, and a second set of viscous coupling plates 54 splined to an internally splined portion of the outer casing 52 for rotation therewith and interleaved with the first set of coupling plates 53. The viscous fluid chamber formed between the inner sleeve 51 and outer casing 52 is filled with a predetermined amount of silicone fluid. As shown clearly in FIG. 4, the inner sleeve 51 is rotatably mounted on the first shaft 12 at its left-hand portion, while the outer casing 52 is splined to the first shaft 12 at its left-hand portion 52a for rotation therewith. The inner sleeve 51 is formed at its right-hand portion with internal spline teeth 51a, and the outer casing 52 is formed at its right-hand portion with internal spline teeth 52b. The internal spline teeth 51a and 52b are located in the annular space which is formed by the annular stepped portion 12a of first shaft 12 to accomodate the left-hand portion of clutch sleeve 44 therein. The clutch sleeve 44 is formed at its left-hand portion with external spline teeth 44a engageable with the internal spline teeth 51a and 52b of inner sleeve 51 and outer casing 52. In this modification, it is to be noted that the internal spline teeth 51a of inner sleeve 51 and the external spline teeth 44a of clutch sleeve 44 are formed smaller in axial length than those in the power transfer device shown in FIG. 1.

Hereinafter, operation of the modification will be described with reference to FIGS. 3-5. When the shift lever is retained in the first position $F_4$ for four-wheel drive, the clutch sleeve 44 is retained by the shift fork 15 in a first position I to engage only the internal spline teeth 51a of inner sleeve 51. In this condition, the first shaft 12 acts to transfer the output drive torque from the power transmission to the front road wheels therethrough, while the viscous clutch coupling 50 normally allows the second shaft 13 to rotate at a different speed than the first shaft 12 to effect differentiation between the front and rear axles. This is effective to eliminate a tight corner braking phenomenon during travel of the vehicle in the four-wheel drive mode. As the resistance to shearing of the viscous fluid between the coupling plates 53 and 54 increases, the viscous clutch coupling 50 acts to transfer the output drive torque to the second shaft 13 through the clutch sleeve 44, drive sprocket 41, chain 43 and driven sprocket 42.

When the shift lever is shifted to and retained in the second position $L_4$ for four-wheel drive, the clutch sleeve 44 is retained by the shift fork 15 in a second position II to engage the internal spline teeth 51a and 52b of outer casing 52. In this condition, the viscous clutch coupling 50 acts to connect therethrough the drive sprocket 41 to the first shaft 12. Thus, the first shaft 12 acts to transfer therethrough the output drive torque from the power transmission to the rear road wheels and is drivingly connected to the second shaft 13 through the drive chain 43 to transfer the output drive torque to the front road wheels to provide a four-wheel drive.

When the shift lever is shifted to and retained in the position $R_2$ for two-wheel drive, the clutch sleeve 44 is retained by the shift fork 15 in a third position III to disengage from both the internal spline teeth 51a and 52b of inner sleeve 51 and outer casing 52 as shown in FIG. 4. In such a condition, the drive sprocket 41 freely rotates on the first shaft 12 to disconnect the torque transmission to the second shaft 13, and the first shaft 12 acts to transfer the output drive torque from the power transmission only to the rear road wheels thereby to provide a two-wheel drive.

From the above description, it will be understood that in the modification the two-wheel drive can be provided without provision of the shift mechanism for the first clutch sleeve 25 shown in FIG. 1.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. A power transfer device adapted for use in combination with a power transmission for an automotive vehicle, comprising:

a housing;

a first shaft rotatably mounted within said housing and having an input end for drive connection to an output shaft of said power transmission and an output end for drive connection to a first set of road wheels;

a second shaft rotatably mounted within said housing in parallel with said first shaft and having an output end for drive connection to a second set of road wheels;

a drive member rotatably mounted on said first shaft;

a driven member mounted on said second shaft for rotation therewith and being drivingly connected to said drive member;

a limited-slip differential in the form of a viscous clutch coupling including an outer casing mounted on said first shaft for rotating therewith, an inner sleeve coupled with said outer casing in a liquid-tight manner for defining a viscous fluid chamber and for relative rotation thereto and being rotatably mounted on said first shaft, a first set of viscous coupling plates splined to an internally splined portion of said outer casing, and a second set of viscous coupling plates splined to an externally splined portion of said inner sleeve and being interleaved with said first set of coupling plates; and a clutch sleeve axially movably mounted on a hub portion of said drive member for rotation therewith and shiftable between a first position where it is retained to engage both said outer casing and inner sleeve of said clutch coupling and a second position where it is retained to engage only said inner sleeve of said clutch coupling.

2. A power transfer device as claimed in claim 1, wherein said driven member is rotatably mounted on said second shaft and connectable to said second shaft, and wherein a second clutch sleeve is axially slidably mounted on said second shaft and shiftable between a first position where it is retained to connect said driven member to said second shaft and a second position where it is retained to disconnect said driven member from said second shaft.

3. A power transfer device as claimed in claim 1, wherein said driven member is integrally provided on said second shaft for rotation therewith, and said clutch sleeve is further shiftable to a third position where it is retained to disconnect both said outer casing and inner sleeve from said drive member.

4. A power transfer device adapted for use in combination with a power transmission for an automotive vehicle, comprising:
   a housing;
   a first shaft rotatably mounted within said housing and having an input end for drive connection to an output shaft of said power transmission and an output end for drive connection to a first set of road wheels;
   a second shaft rotatably mounted within said housing in parallel with said first shaft and having an output end for drive connection to a second set of road wheels;
   a drive member rotatably mounted on said first shaft;
   a driven member integrally provided on said second shaft for rotation therewith and being drivingly connected to said drive member;
   a limited-slip differential in the form of a viscous clutch coupling including an outer casing mounted on said first shaft for rotation therewith, an inner sleeve coupled with said outer casing in a liquid-tight manner for defining a viscous fluid chamber and for relative rotation thereto and being rotatably mounted on said first shaft, a first set of viscous coupling plates splined to an internally splined portion of said outer casing, and a second set of viscous coupling plates splined to an externally splined portion of said inner sleeve and being interleaved with said first set of coupling plates;
   a clutch sleeve axially movably mounted on an externally splined hub portion of said drive member for rotation therewith and shiftable between a first position where it is engaged with only said inner sleeve of said clutch coupling, a second position where it is engaged with only said outer casing of said clutch coupling, and a third position where it is disengaged from both said outer casing and inner sleeve of said clutch coupling.

* * * * *